(12) United States Patent
Ersfeld et al.

(10) Patent No.: US 6,280,815 B1
(45) Date of Patent: Aug. 28, 2001

(54) CUSTOM-FORMABLE SHOE INSERT

(75) Inventors: Dean A. Ersfeld, Maplewood; Richard E. Anderson, Vadnais Heights; Michael L. Ruegsegger, Mahtomedi; Kelly T. McGurran, North Oaks; Richard A. Mallo, Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/429,509

(22) Filed: Oct. 28, 1999

Related U.S. Application Data (60) Provisional application No. 60/106,301, filed on Oct. 30, 1998.

(51) Int. Cl.[7] .................................................. B32B 3/00
(52) U.S. Cl. .................................. 428/71; 36/3 B; 36/44; 428/218
(58) Field of Search ............................ 428/71, 306.6, 428/308.4, 313.3, 313.5, 319.3, 218; 36/44, 3 B (56) References Cited

U.S. PATENT DOCUMENTS

| | | | |
|---|---|---|---|
| 3,516,941 | 6/1970 | Matson | 252/316 |
| 3,805,417 | * 4/1974 | Lobmeier | 36/32 |
| 4,331,731 | * 5/1982 | Seike et al. | 428/305 |
| 4,376,438 | 3/1983 | Straube et al. | 128/90 |
| 4,433,680 | 2/1984 | Yoon | 128/90 |
| 4,502,479 | 3/1985 | Garwood et al. | 128/90 |
| 4,667,661 | 5/1987 | Scholz et al. | 128/90 |
| 4,694,589 | * 9/1987 | Sullivan et al. | 36/44 |
| 4,705,840 | 11/1987 | Buckanin | 528/53 |
| 4,888,225 | * 12/1989 | Sandvig et al. | 428/71 |
| 5,027,803 | 7/1991 | Scholz et al. | 128/89 |
| 5,095,570 | 3/1992 | Bar et al. | 12/142 N |
| 5,195,945 | 3/1993 | Sandvig et al. | 602/8 |
| 5,203,793 | 4/1993 | Lyden | 36/88 |
| 5,354,259 | 10/1994 | Scholz et al. | 602/8 |
| 5,366,801 | 11/1994 | Bryant et al. | 428/283 |
| 5,499,460 | * 3/1996 | Bryant et al. | 36/43 |
| 5,540,652 | 7/1996 | Callinan et al. | 602/1 |
| 5,716,661 | 2/1998 | Scholz et al. | 427/2.31 |
| 5,744,528 | 4/1998 | Callinan et al. | 524/265 |
| 5,958,546 | * 9/1999 | Mardix et al. | 428/71 |

FOREIGN PATENT DOCUMENTS

| | | |
|---|---|---|
| 0306327 | 3/1989 | (EP). |
| 0352095 | 1/1990 | (EP). |

* cited by examiner

*Primary Examiner*—Blaine Copenheaver
*Assistant Examiner*—Leanna Roché
(74) *Attorney, Agent, or Firm*—Yen Tong Florczak (57) ABSTRACT

A custom-formable shoe insert is disclosed that comprises (1) a conformable substrate layer, where at least a portion of the substrate layer is impregnated with a storage-stable, settable resin that set after exposure to an activator; and (2) an outer layer that is impervious to the settable resin but at least a portion of which is pervious to the activator.

3 Claims, 4 Drawing Sheets

CUSTOM-FORMABLE SHOE INSERT

CROSS-REFERENCE TO RELATED APPLICATIONS

This application claims priority from U.S. Provisional Application Ser. No. 60/106,301 filed Oct. 30, 1998.

TECHNICAL FIELD

The present invention provides custom-formable shoe inserts.

BACKGROUND

A wide variety of stock shoe inlays are currently available for helping to accommodate a number of foot conditions, or to adjust biomechanical parameters that affect foot, leg, and back pain during walking and running. Stock shoe inlays, available in pre-made shapes and sizes, are intended to provide one or more of the following functions: heel cushioning, longitudinal arch support, take up of extra room in shoe, and absorption of odors. Although stock shoe inlays are often convenient (they can be simply placed in the shoe and used immediately) they lack a custom fit and are not always able to provide the customer's desired function.

Custom fit shoe inserts, meant to fit directly to an individual's shoe, also exist. One such insert is composed of a bladder shaped to fit into a shoe and containing a water foamable resin. When water is injected into the bladder, the resin foams, causing the bladder to become shaped to the foot. Unfortunately, this insert is inconvenient to form and also inherently lacks porosity. The lack of porosity can make the insert feel sweaty and uncomfortable. Another insert is composed of a gel contained within membrane layers. When pressure is exerted against the insert, the gel moves to accommodate the shape of the foot. Again, this insert lacks porosity. Yet another insert is composed of a series of bladders into which air is pumped to achieve support under a foot. Unfortunately, this insert lacks a true custom fit and also lacks porosity.

Alternatively, professionally crafted custom shoe inserts are available that are custom-shaped to an individual's feet. These inserts are typically constructed by a trained professional to provide additional functionality, including heel pad containment, lateral arch support, more effective longitudinal arch support, and correction for abnormal biomechanics, such as pronation and supination. These professionally crafted custom-shaped inserts can be expensive. Previous custom-shaped shoe inserts are typically constructed by (i) preparing a mold of the foot, for example with Plaster-of-Paris; (ii) forming the custom shoe insert components on the mold, for example by thermoforming; and then (iii) machining the construction to fit the shoe. Taken together, all of these steps can take days or weeks to complete.

What is needed is a custom-formable, preferably porous, shoe insert that is easy and inexpensive to customize.

SUMMARY OF THE INVENTION

The present invention provides an easy to use shoe insert that custom form to and permanently retains the shape of the foot that it will support and the shoe in which it will be used. As used herein, the term "shoe insert" is meant to include inserts for all forms of footwear, including, for example, pedestrian and athletic shoes and boots of all kinds (e.g., work boot and ski boots), etc. The insert is comprised of (i) a conformable, porous substrate layer (at least a portion of which is impregnated with a storage-stable, settable resin) and (ii) an outer layer, impervious to the settable resin, but at least a portion of which is pervious (e.g., accessible or permeable) to an activator, and surrounding all sides of the substrate layer. In preferred embodiments, the custom formed shoe insert also comprises a component that provides a cooling effect to over-come heat build up in the shoe (e.g., heat buildup caused by the R-value of the shoe and/or insert or by heat from the environment). The cooling effect could occur during the setting of the resin and during use of the custom shoe insert.

BRIEF DESCRIPTION OF THE DRAWINGS

The invention is further explained with reference to the drawings, wherein.

These figures are idealized, are not to scale, and intended to be merely illustrative and non-limiting.

DETAILED DESCRIPTION OF THE INVENTION

Suitable substrate layers are composed of one or more conformable, preferably porous materials, which may include foams (e.g., open-celled foam), and/or fabrics (e.g., knit, woven, or nonwoven fabrics). Suitable fabrics comprise fibers of such materials as glass, polyester, polyethylene, polypropylene, polyurethane, and cotton. Preferred conformable porous substrate layers (often referred to as "substrate layer") include open-celled foam, open celled foam that has been flame-bonded to knit fiberglass (as described in U.S. Pat. No. 4,683,877, which is hereby incorporated by reference), and three dimensional knit spacer fabric where two textile surfaces are held apart by monofilament spacer yarn.

A number of open-celled foams are suitable for use as a substrate layer, such as polyether or polyester-based polyurethane foams. Preferably, the porosity of the substrate layer is such that it can be resin impregnated sufficiently to provide a satisfactory custom formable shoe insert. The open-celled foam preferably has from about 10 to 50 pores per centimeter (i.e., about 30 to 120 pores per inch), more preferably, from about 20 to 40 pores per centimeter. As used herein, the term "pores per centimeter" refers to the average number of pores in a linear centimeter of a foam sheet. The number of pores per linear centimeter may be determined in a number of methods known to those skilled in the art. The methods include, e.g., photomicrographic means or measuring the foam's resistance to airflow or a pressure differential. Such measurements can be used to calculate the average number of pores per unit length in the foam.

When the number of pores per centimeter decreases below about 10, the foam may become too coarse or rough for use as a substrate layer. Typically, such foams do not hold enough resin thereby possibly failing (1) to provide the necessary strength for the resin impregnated substrate layer or (2) to retain the desired conformability of the user's foot. The maximum number of pores per centimeter value is typically determined by the ability to impregnate the foam with enough resin to provide sufficient properties for use as a substrate layer.

The foam useful for use as the substrate layer preferably has a density in the range of about 0.02 to 0.15 $g/cm^3$, and more preferably between about 0.02 to 0.07 $g/cm^3$. Foam sheets having densities higher than about 0.15 $g/cm^3$ tend to preclude the ability to impregnate the foam with resin to the extent necessary so as to allow retention of the shape of the user's foot after activation and curing.

Suitable foams for use as the substrate layer has an indentation force deflection (IFD) of between about 0.96 kPa (20 lbs./ft.$^2$) to 4.8 kPa (100 lbs./ft.$^2$), preferably between about 1.9 kPa (40 lbs./ft.$^2$) to 3.8 kPa (80 lbs./ft.$^2$). The IFD value can be measured by determining the force required to compress a 10.2 cm thick by 61 cm by 61 cm foam sheet to 75% of its original thickness using a plunger having a diameter of about 10 cm.

Examples of suitable commercially available foams for use as the substrate layer include those having trade designations E-100, E-150, E-290, P-60, P-80, and P-100, all commercially available from Illbruck USA, Minneapolis, Minn. Other suitable foams include trade designations 17450 and 17230, both commerically available from Federal Foam Technologies, Inc., Ellsworth, Wis. A presently preferred commercial foam for use as the substrate layer includes trade designation 8800, available from Technifoam, Inc., Minneapolis, Minn.

The dimensions of the substrate layer are dependent upon the size of shoe insert, which in turn is dependent upon the size of the user's foot. Generally, the more important dimension is the thickness of the substrate layer, i.e., the distance (s) between the major surface nearest the foot and the opposite surface thereto. The other dimensions of the substrate layer (e.g., those determined by the surface area of the foot to be supported and/or cushioned) can vary as desired. Preferably, the substrate layer has a thickness between about 0.2 to 3 cm, and more preferably between about 0.5 to 2.0 cm. The substrate layer need not be of uniform thickness, particularly in situations, e.g. where a portion of the foot, such as an arch, requires additional support or cushioning.

At least a portion of the conformable porous substrate layer is impregnated with a storage-stable, settable resin. Several resin impregnated, substrates layers may be used in combination with each other to increase or vary the compression resistance and thickness in specific areas of the custom formed shoe insert. Alternatively, the variation can be achieved by contouring or shaping an initially thick substrate layer and coating the contoured substrate layer with one or more resins capable of causing the substrate to retain the shape of the foot. The substrate layer can be use alone or in combination with other materials, e.g., to vary its thickness, to provide additional strength and/or durability, or to more widely vary its density, etc. The other materials can include, e.g. resin-impregnated knit fabrics, or other resin-impregnated foam sheet materials, e.g., using a different foam and/or resin in order to provide such different properties. The other materials could also include plastics, leather, metal and the like and may be applied before, during or after setting or curing of the resin impregnated substrate layer. Preferably, the other materials are of a type that will bond themselves to the substrate layer as it cures, by virtue of the inherent adhesive qualities of the settable resin used.

More than one settable resin may be coated into the flexible porous substrate layer to vary the compression resistance in specific areas of the inventive custom-formed shoe insert. For example, a soft, pliable (after setting) resin may be coated into a portion of the substrate layer and a semi-rigid (after setting) resin may be coated on other portions of the substrate layer.

The compression resistance of a cured, resin impregnated (alternatively referred to as "coated") substrate layer can be determined as follows. Apply a load of about 1.05 kg/cm$^2$ at a rate of about 127 cm/minute to a substrate sample of known starting thickness. Measure the thickness of the substrate layer after compression. The compression resistance is the ratio of the thickness after compression to the initial thickness. The ratio is multiplied by 100 to arrive at a percentage value.

Soft (after setting) resins allow the substrate to be compressed preferably from about 25 to 90%, more preferably from about 35 to 75%. Semi-rigid resins (after setting) allow the substrate to be compressed preferably from about 9 to 25%, more preferably from about 10 to 15%. These compression resistance values are for a substrate layer open cell foam before impregnated with a resin having an IFD of about 0.96 to 4.8 kPa.

Suitable storage stable, settable resins for use in the present invention include water-curable resins, thermoplastics, or water-based resins. A preferred resin is a water-curable, isocyanate functional, polyurethane prepolymer resin. Such resins are described in U.S. Pat. Nos. 4,667,661; 5,354,259; 5,423,785; 5,540,652; 5,716,661; and 5,744,528, which are hereby incorporated by reference.

In order to obtain the desired soft, pliable (after setting) resin or semi-rigid (after setting) resin in the cured substrate layer, one skilled in the art will take care in choosing an appropriate polyol and an appropriate polyisocyanate to form the preferred polyurethane prepolymer resin. Selection of the polyol can depend on the average hydroxyl equivalent weight, i.e., the average molecular weight of the polyol(s) divided by the average number of reactive hydroxyl (OH) groups per mole of polyol(s). Typically, for semi-rigid (after setting) resin, the average hydroxyl equivalent weight of the polyol or polyol blend will preferably be between about 400 to 800 grams, more preferably between about 450 to 550 grams. Typically, for soft (after setting) resin, the average hydroxyl equivalent weight of the polyol or polyol blend will preferably be between about 800 to 2400 grams, more preferably between about 1000 to 1500 grams.

Suitable polyols for use in the prepolymer resin include polyalkylene ethers derived from the condensation of alkylene oxides (such as those commercially available from ARCO Chemical Co., Newtown Square, Pa., under the tradename POLYOL PPG and those commercially available from BASF™ Wyandotte Corp. under the tradename PLURACOL™), polytetramethylene ether glycols (such as the POLYMEG™ polyols commercially available from the Quaker Oats Co.), polycaprolactone polyols (such as the NIAX PCP series of polyols available from Union Carbide), and polyester polyols (hydroxyl-terminated polyesters obtained from esterification of dicarboxylic acids and diols) such as the RUCOFLEX™ polyols available from the Ruco Division of the Hooker Chemicals Company.

Examples of useful commercially available polyols include (1) polypropylene glycols, such as trade designations PPG 725, PPG 1025, PPG 2025, and PPG 3025, all from ARCO Chemical Company, (2) polypropylene triols, such as trade designations LHT™ 42 and LHT™ 28, available from Dow Chemical, Midland, Mich., and (3) tetrols such as trade designation TETRONIC™ 1501 available from BASF™ Wyandotte Corp., Parsippany, N.J.

Preferably the polyols used are urethane grade. As used herein, the term "urethane grade" refers to polyols having a purity grade suitable for polyurethane production, as described, e.g., in Appendix B of Polyurethanes—Chemistry and Technology, J. H. Saunders and K. C. Frisch, eds., R. E. Krieger Publishing Co., Huntington, N.Y. (1978), the disclosure of which is hereby incorporated by reference.

However, it will be understood that the term "polyol" also includes virtually any functional compound having active hydrogen in accordance with the well-known Zerevitinov test, as described, e.g. in Chemistry of Organic Compounds by Carl R. Noller, Chapter 6, pp. 121–122 (1957) the disclosure of which is hereby incorporated by reference. Thus, for example, thiols and polyamines could also be used as polyols in the present invention. In such instances, the NCO to active-hydrogen ratio of the polyisocyanate to the active hydrogen compound used to form the polythiocarbamate, polyurea, or other polymer, should fall within the same ranges as disclosed below for the NCO:OH ratios.

Also in the present invention, care should be taken in choosing the isocyanate equivalent weight of the prepolymer, which is defined generally as the grams of prepolymer (i.e., polyol and isocyanate) per NCO group in the prepolymer. For purposes of the present invention, it has been found that for soft (after setting) resin, the isocyanate equivalent weight is preferably about 600 to 2300 grams, more preferably about 700 to 1500 grams of prepolymer per NCO group. For semi-rigid (after setting) resin, the isocyanate equivalent weight is preferably about 350 to 600 grams, more preferably about 400 to 500 grams of prepolymer per NCO group.

Examples of isocyanates used to form polyisocyanates that are suitable for purposes of the present invention are disclosed, e.g., in U.S. Pat. Nos. 4,376,438, 4,433,680, and 4,502,479. Isocyanates that are presently preferred include 2,4'-diphenylmethane diisocyanate, 4,4'-diphenylmethane diisocyanate, mixtures of these isomers together with possible small quantities of 2,2'-diphenylmethane diisocyanate (the latter typical of commercially available diphenylmethane diisocyanates), and aromatic polyisocyanates and their mixtures, such as are derived from phosgenation of the condensation product of aniline and formaldehyde. It is presently preferred to use an isocyanate that has low volatility, such as diphenylmethane diisocyanate, rather than a more volatile material such as toluene diisocyanate. Commercially available isocyanate starting materials include (1) ISONATE™ 2143L commercially available from Dow Chemical, LaPorte, Tex., which is believed to be a mixture of isocyanate compounds containing about 73% by weight of diphenylmethane diisocyanate, (2) MONDUR™ MRS-10 commercially available from Mobay Chemical Corp., New Martinsville, W.Va., and (3) and PAPI™, a polyaromatic polyisocyanate commercially available from Dow Chemical, Midland, Mich.

The NCO:OH ratio of the components of the prepolymer resin is preferably about 2:1 to 8:1, and more preferably about 2.5:1 to 4:1. It has been found that NCO:OH ratios lower than about 2:1 do not provide enough excess isocyanate groups to achieve adequate cross-linking of the resin during cure, while NCO:OH ratios greater than about 8:1 tend to produce undesirable stiffness and/or brittleness. Higher NCO:OH ratios, i.e., approaching about 8:1, would generally be useful with polyols having higher hydroxyl equivalent weights.

Especially preferred resin components for use in the substrate layer include an isocyanate under the tradename ISONATE™2143L and a polypropylene oxide polyols under the tradenames LHT™-42 and PPG-1025. To prolong the shelf stability of a resin impregnated custom formable shoe insert, it is preferred to include about 0.02 to 0.1 percent by weight (based on the weight of the prepolymer resin) of benzoyl chloride and/or other suitable stabilizer (e.g., an antioxidant such as butylated hydroxy toluene in an amount of about 0.05 to 0.25 weight percent) in the prepolymer resin.

The resin systems of the present invention preferably contain a catalyst to control the set time and cure time of the resin. The term "resin system" as used herein refers to the prepolymer resin itself, i.e., the combination of polyol and isocyanate, as well as any other ingredients (e.g., catalyst(s), stabilizer(s), plasticizer(s), antioxidant(s), and the like) added to the prepolymer resin, or to either the polyol or isocyanate components thereof, prior to or simultaneously with their impregnation into the foam useful as the substrate layer. The term "set time" as used herein refers to the time needed for an activated shoe insert to hold its conformed shape. After the set time, the shoe insert may be removed from contact with the user's foot while it continues to cure. The term "cure time" as used herein refers to the time needed for the resin to cross-link to the most complete extent it is going to cross-link under the conditions chosen.

During the set time, the activated shoe insert should exhibit an exotherm compatible for use in apposition to a mammalian body part, e.g., preferably an exotherm of less than about 43° C. (109° F.) and more preferably less than about 40° C. (104° F.). The resin system of the present invention can be adjusted in a variety of ways to obtain suitable exotherm during cure, e.g., by decreasing the resin-loading level; increasing the isocyanate equivalent weight of the prepolymer resin; reducing the NCO:OH ratio, using microcapsules containing a material that melts at a desired maximum temperature, adjusting the amount of catalyst present in the settable resin as needed, and combinations thereof.

To produce suitable custom formable shoe inserts in accordance with the present invention, a set time of less than about 10 minutes following activation of the resin by exposure to water is preferred, with the more preferable set time being less than about 5 minutes. Frequently, set times on the order of about 4 minutes or even about 3 minutes or about 2 minutes can be achieved. Suitable catalysts can be chosen for moisture curing water activated prepolymer resins. For example, tertiary amines such as 2,2'-dimorpholinodiethyl ether (DMDEE) described in U.S. Pat. No. 4,433,680, and 2,2'-dimorpholinyldialkyl ethers such as 4-[2-[1-methyl-2-(4-morpholinyl)ethoxy]ethyl]morpholine (MEMPE) described in U.S. Pat. No. 4,705,840, in amounts ranging from about 0.5% to 7% and preferably from about 2% to about 5% by weight, based on the weight of the prepolymer resin, can be used.

Plasticizers can be, and preferably are, incorporated into the settable resin in order to maintain resilience of the cured substrate within the shoe insert over time. A plasticizer such as butyl benzylphthalate, (e.g., a commercially available one under the tradename SANTICIZER™ 160 from Monsanto Company, St. Louis, Mo.) can be added to the resin system in an amount of about 1% to 20% by weight, based on the weight of the prepolymer resin. A preferred amount of this plasticizer is between about 8% to 12% by weight. The use of a plasticizer is particularly preferred in order to prepare resins having NCO:OH ratios approaching about 8:1. Resins NCO:OH ratio greater than about 4:1 tend to be stiff and/or brittle when used without plasticizer Preferably the resin system used is impregnated into the porous substrate in a solvent-less manner, i.e., without the use of solvents such as organic solvents, e.g., methylene chloride, and the like. Generally, resins having a viscosity of about 100,000 centipoise or less can be impregnated into the porous substrate without the use of solvents by known methods, e.g., by manually squeezing or otherwise manipulating the resin system into the substrate.

Resin systems having higher viscosities, i.e. greater than about 100,000 cps, can generally also be impregnated into porous substrate without the use of solvents, e.g., in the manner described in U.S. Pat. No. 4,888,225, wherein the polyol and isocyanate components of the prepolymer resin are blended immediately before impregnating into the substrate layer and allowed to react in situ in the substrate layer to form the prepolymer resin.

Preferably, the substrates layer of the present invention are impregnated with resin systems at coating weights of at least about 60% by weight of the total material, more preferably at least about 70% by weight, and most preferably at coating weights of at least about 80% by weight. Surprisingly, the prepolymer resin can often be impregnated into the substrate layer of the present invention so as to comprise as much as 85%, 90% and even 95% by weight while still retaining suitable porosity, resilience and conformability, depending on the porous substrate and on the settable resin chosen.

The resin-impregnated substrate layer of the present invention and the custom formable shoe inserts containing the resin-impregnated substrate layer are preferably prepared in a relatively low humidity chamber and sealed within a water vapor-impermeable package. This package is opened just prior to application of the custom formable shoe insert.

Suitable outer layers include materials which are impervious to the settable resin, yet at least a portion of which are pervious (e.g., permeable or accessible) to air and moisture. This provides comfort to the user by allowing moisture to escape from the foot. When a moisture-curable resin is used, the outer layer preferably allows water to pass into the substrate layer, thereby causing the resin to cure and the substrate layer to hold the shape of the foot and shoe. Because the outer layer is impervious to the settable resin, the resin stays within the outer layer during storage and handling, preventing contact with the user's clothes and skin. In the case where a water curable resin is used, the outer layer could act as a filter to retain the resin particles while allowing water to exit the substrate layer, thereby causing the resin particles to coalesce and set the substrate layer in the shape of the foot and shoe.

The outer layer may act as a barrier to the settable resin by several mechanisms. In one embodiment the outer layer may have a low surface energy relative to the settable resin. This may be accomplished by coating the outer layer with a fluorochemical or silicone, or by treating the fibers used to make the outer layer with a fluorochemical or silicone (e.g., by surface coating or mixing the fluorochemical or silicone with the fiber material during extrusion or solvent spinning). In another embodiment the outer layer may act as a barrier to the settable resin by limiting the size of the openings through which the resin must travel. In addition, the path length of the openings can be extended by virtue of the outer layer thickness to contain the resin. Furthermore, some or all of these conditions may be used together to achieve the resin barrier effect while allowing moisture and air to flow.

Suitable outer layer materials include spunlaced, spunbonded, blown microfiber, stitchbonded, and needle punched nonwovens. Tightly knitted and woven fabrics and open-cell foams may also be effective. When a moisture-curable resin is used in the substrate layer, fibers from which these materials are made preferably include those that can be sufficiently dried to provide good shelf stability. Preferred outer layer materials are sufficiently thin to avoid limiting space for the foot in the shoe. Examples include (1) FC-280 treated SONTARA™ 8000 and (2) a polyurethane, blown microfiber nonwoven, stitch bonded with a polyester yarn. The trade designation FC-280 is a fluorochemical available from 3M™ Company, St. Paul, Minn. and the trade designation SONTARA™ 8000 is a spunlaced non-woven polyester, available from Du Pont Company, Wilmington, Del.

One or more optional cover layers may be added adjacent to the outer layer (on either the foot or shoe side of the insert or both) to provide increased wear resistance. A fully dried leather sheet could be used for this purpose. Alternatively, a durable foam layer may be used.

To achieve the cooling effect, it has been surprisingly found that addition of ureaformaldehyde microcapsules containing octadecane to the moisture curable polyurethane resin impregnated or coated open-cell foam substrate layer kept the temperature of the shoe insert's surface in contact with the foot cooler than a shoe surface in contact with the foot without the shoe insert present or with the insert surface without microcapsules in contact with the foot. Preferably, the polyurethane resin contains about 20 percent by weight urea-formaldehyde capsules, based on the total weight of the resin. It is expected that additional cooling effect can be achieved by distributing the microcapsules throughout the substrate layer, and by adding more microcapsules. Microcapsules suitable for use in the present invention are disclosed in U.S. Pat. Nos. 5,499,460 and 5,366,801, which are hereby incorporated by reference.

The present invention provides a quick and easy forming shoe insert that conforms to the shape of the foot and shoe with which it will be used and then permanently retains that shape while providing longitudinal arch support, improved pressure distribution, and/or cooling.

Figure 1A:
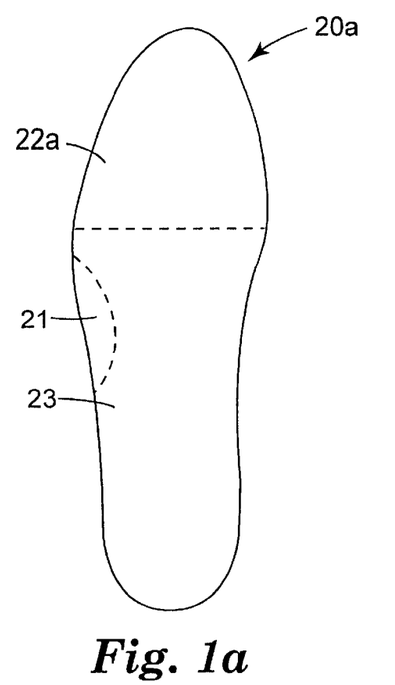
FIG. 1a is a top view of a custom-formable shoe insert of the present invention.

FIG. 1a is a top view of a custom-formable shoe insert 20a of the present invention. The shoe insert 20a contains a conformable, porous substrate layer 21 (shown by cutout) (at least a portion of which is impregnated with a storage-stable, settable resin) and (ii) an outer layer 23, impervious to the settable resin, but at least a portion of which is pervious (e.g., accessible or permeable) to an activator, and surrounding all sides of the substrate layer. The insert may include an optional toe portion 22a (as shown) or may omit this portion of the insert. In this embodiment the shoe insert 20a is generally planar prior to being formed to a foot and shoe.

Figure 1B:
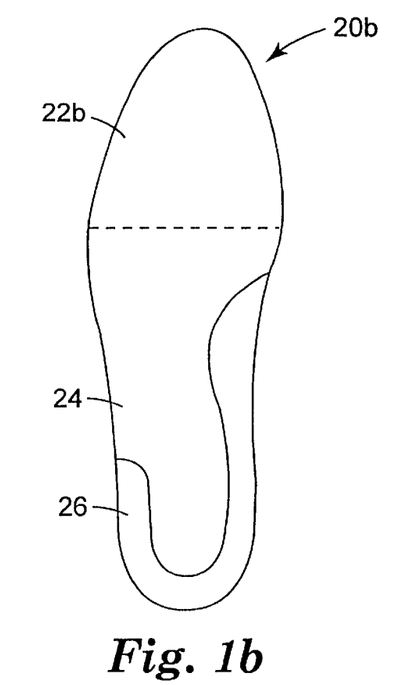
FIG. 1b is a top view of a custom-formable shoe insert of the present invention.

FIG. 1b is a top view of a custom-formable shoe insert 20b of the present invention. The insert of this embodiment comprises a conformable, porous substrate layer having at least two different rigidity settable resins. A first portion of the insert 24 is impregnated with a soft settable resin. A second portion of the insert 26 is impregnated with a semi-rigid settable resin. The insert may include an optional toe portion 22b (as shown) or may omit this portion of the insert. In this embodiment the shoe insert 20b is generally planar prior to being formed to a foot and shoe.

Figure 2A:
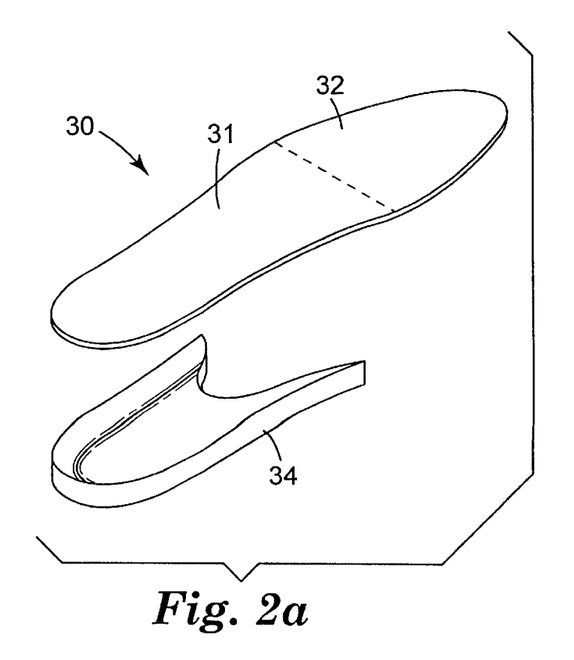
FIG. 2a is an exploded perspective view of a custom-formable shoe insert of the present invention.
Figure 2B:
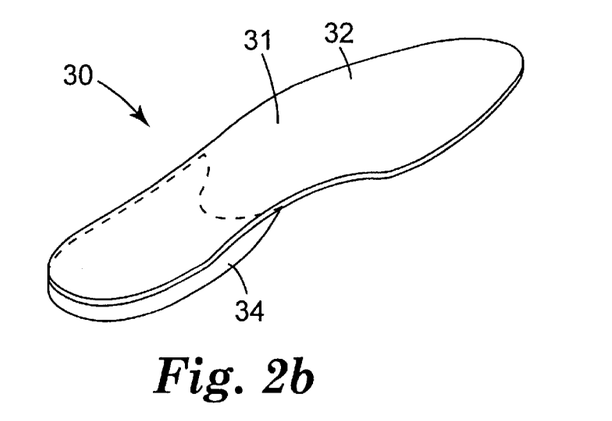
FIG. 2b is an assembled custom-formable shoe insert of the present invention.

FIG. 2a is an exploded perspective view of a custom-formable shoe insert 30 of the present invention. As shown the insert comprises a generally planar piece 31 (optionally containing a toe portion 32) and a contoured heel piece 34. Planar piece 31 comprises a settable resin. In a preferred embodiment the settable resin is a soft resin. Contoured heel piece 34 is preformed to generally conform to an average foot and comprises a settable resin. In a preferred embodiment the settable resin is a semi-rigid resin. FIG. 2b is an assembled custom-formable shoe insert of the present invention. In this embodiment planar piece 31 is attached to contoured heelpiece 34. The attachment of pieces may be by any suitable bonding method, for example by glues, adhesives, thermal bonding technique, sewing, etc. The pieces may also be attached or held together by being surrounded together with a suitable outer layer (not shown).

Figure 3:
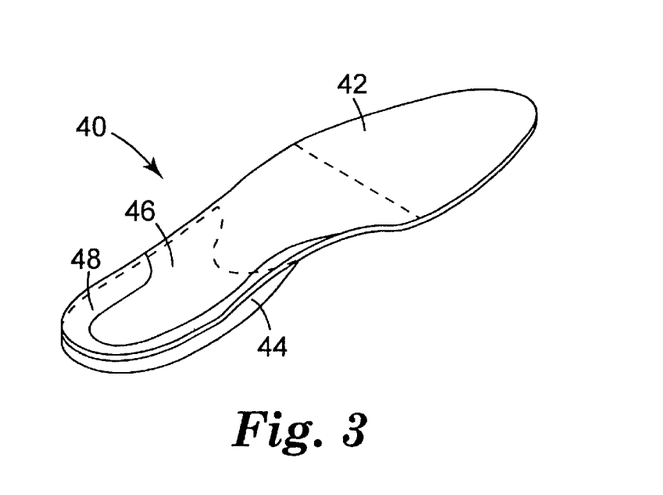
FIG. 3 is a perspective view of a custom-formable shoe insert of the present invention.

FIG. 3 is a perspective view of a pre-contoured custom-formable shoe insert 40 of the present invention. The insert of this embodiment comprises a contoured heel portion 44 and optionally comprises a planar toe portion 42. In preferred embodiments the insert comprises a conformable, porous substrate layer having at least two different rigidity settable resins. A first portion of the insert 46 is impregnated with a soft settable resin. A second portion of the insert 48, which generally defines a region around the heel of the foot, is impregnated with a semi-rigid settable resin.

Figure 4:
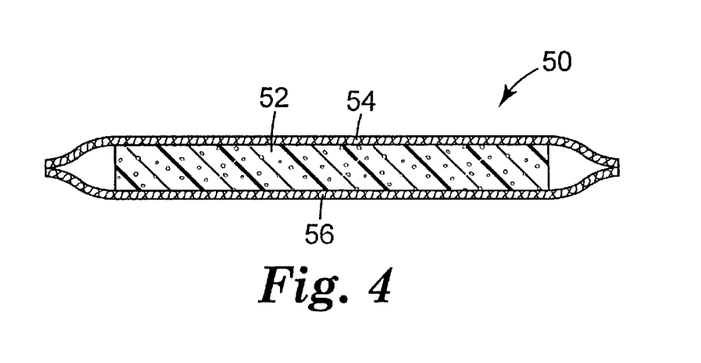
FIG. 4 is a cross-section view of a custom-formable shoe insert of the present invention.

FIG. 4 is a cross-section view of a custom-formable shoe insert 50 of the present invention. The insert is comprised of (i) a conformable, porous substrate layer 52 (at least a portion of which is impregnated with a storage-stable, settable resin) and (ii) an outer layer (54 and 56), impervious to the settable resin, but at least a portion of which is pervious (e.g., accessible or permeable) to an activator, and surrounding all sides of the substrate layer. As shown the outer layer can comprise two separate layers (optionally comprising different materials) joined at the edges of the insert. Alternatively the outer layer can comprise a single material.

Figure 5A:
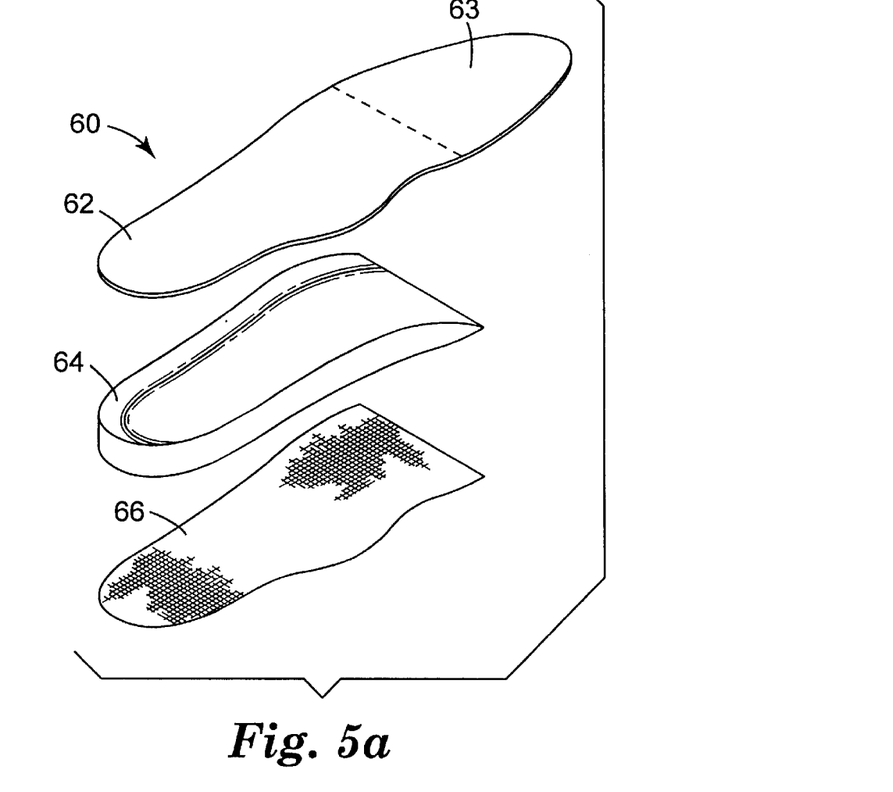
FIG. 5a is an exploded perspective view of a custom-formable shoe insert of the present invention.
Figure 5B:
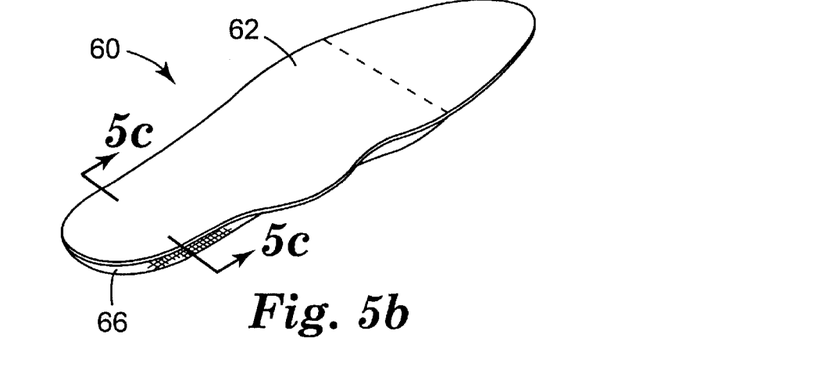
FIG. 5b is an assembled custom-formable shoe insert of the present invention.
Figure 5C:
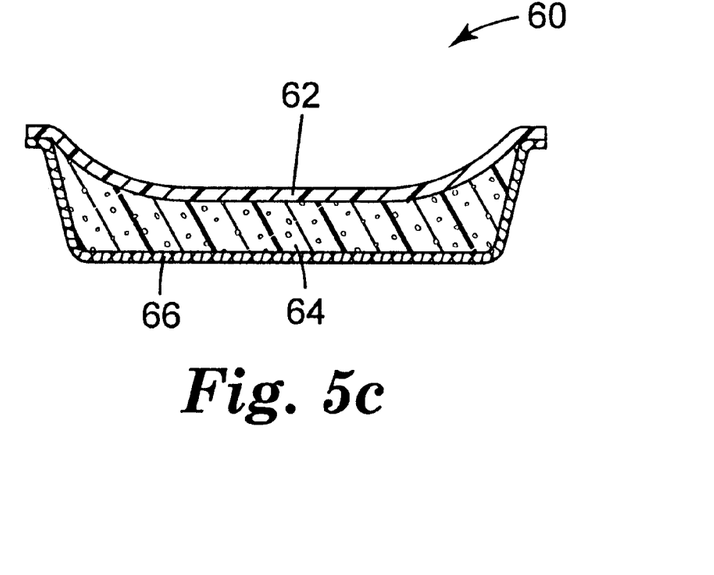
FIG. 5c is a cross-section of the custom-formable shoe insert of FIG. 5b taken along lines 5c—5c.
Figure 5D:
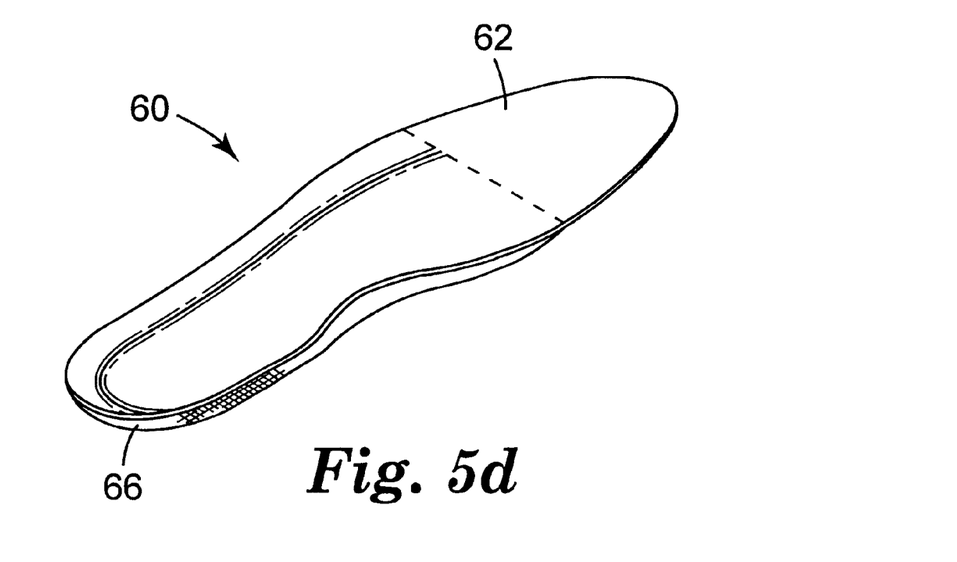
FIG. 5d is an assembled and customized shoe insert after being formed to the foot and shoe of a user.

FIG. 5a is an exploded perspective view of a custom-formable shoe insert 60 of the present invention. In this embodiment the insert comprises a top layer 62 (shown with optional toe portion 63); a middle pre-contoured, conformable, porous substrate layer 64 (at least a portion of which is impregnated with a storage-stable, settable resin); and a lower outer layer 66. Layers 62 and 66 are impervious to the settable resin, but at least a portion of layers 62 and/or 66 are pervious (e.g., accessible or permeable) to an activator. In preferred embodiments top layer 62 comprises a tough, leather-like layer. FIG. 5b is an assembled custom-formable shoe insert 60 of the present invention. As illustrated, top layer 62 and bottom outer layer 66 surround substrate layer 64 (as shown in FIG. 5b). FIG. 5c is a cross-section of the custom-formable shoe insert of FIG. 5b, taken along lines 5c—5c. FIG. 5d is an assembled and customized shoe insert 60 of the present invention after being formed to the foot and shoe of a user.

EXAMPLES

Example 1

An open-cell polyether polyurethane foam piece cut to the dimensions of approximately ⅜" by 4" by 12" (0.95 cm by 10.2 cm by 30.4 cm) from slabs (having a density of about 1.4–1.6 lbs./cubic foot (22.4–25.6 kg/cubic meter) and having an IFD of about 2.01 kPa (44 lb/ft$^2$), available from Federal Foam Technologies Inc., Ellsworth, Wis., USA, was coated with a soft resin by pouring the resin onto the foam and kneading the resin into the foam by hand pressure. Sufficient kneading was done so as to achieve a uniform distribution of resin within the foam. A coating weight of 86% resin by weight, based on the combined weight of the resin and foam, was used. The soft resin was prepared by mixing the components listed below into a Part A and a Part B mix and then combining 35 grams of A and 65 grams of B with vigorous shaking.

| Part A | | Part B | |
|---|---|---|---|
| Component | Parts (w) | Component | Parts (w) |
| Isonate 2143L (Dow Chemical Co.; Midland, MI) | 20.60 | Polyol LHT-42 (Dow Chemical Co., Midland, MI) | 62.07 |
| Benzoyl Chloride | 0.06 | D C Antifoam 1400 (Dow Corning Corp.; Greensboro, NC) | 0.20 |
| Butyl Benzyl Phthalate | 10.00 | Reactint yellow X-15 (Milliken Chemicals, Spartanburg, SC) | 0.25 |
| Pluronic F-38 (BASF Corp., Mount Olive, NJ) | 4.00 | MEMPE[2] | 1.50 |
| Butylated hydroxy toluene[1] | 0.33 | Cab-O-Sil TS-720 (Cabot Corp., Tuscola, IL) | 1.00 |

[1]2,6-di(t-butyl)4-methylphenol
[2]MEMPE = 4-[2-[1-methyl-2-(4-morpholinyl)ethoxy]ethyl]morpholine An open-cell polyether polyurethane foam as above was dimensioned to a 3⅞" (10 cm) diameter disk with a 1" (2.54 cm) thickness in a 2" (5.08 cm) diameter center portion tapering to 0 thickness at the outer circumference. The foam disk was coated with a semi-rigid resin, using the same process and coating weight as above. The semi-rigid resin was prepared by mixing the components listed below into a Part A and a Part B mix and then combining 49.3 grams of Part A and 50.7 grams of Part B with vigorous shaking.

| Part A | | Part B | |
|---|---|---|---|
| Component | Parts (w) | Component | Parts (w) |
| Isonate 2143L | 44.9 | Polyol PPG-1025 (ARCO Chemical Co., Newtown Square, PA) | 48.5 |
| Benzoyl Chloride | 0.06 | DC Antifoam 1400 (Dow Corning Corp., Greensboro, NC) | 0.20 |
| Pluronic F-38 (BASF Corp., Mount Olive, NJ) | 4.00 | Reactint Blue 960 (Milliken Chemicals, Spartanburg, SC) | 0.04 |
| Butylated hydroxy toluene | 0.33 | MEMPE | 1.00 |
| | | Cab-O-Sil TS-720 | 1.00 |

The soft resin impregnated foam was cut to a generic foot shape, about size 10 to 11, using a rule die. The semi-rigid resin impregnated foam disk was cut in half, forming a half circle shape, which was combined with the soft resin impregnated foam in foot shape in its arch area forming an assembly.

This assembly was then sandwiched between two layers of 1% FC-280 treated SONTARA™ 8000 spun-laced polyester nonwoven fabric. The nonwoven fabric layers were sealed with a hot melt adhesive to each other immediately next to the periphery of the foam assembly and trimmed, leaving an edge seal width of approximately 3/16" (0.48 cm). The resulting custom formable shoe insert was sealed in a foil lined pouch in a dry room where the above described resin coating was done.

Example 2

A foam assembly was made as in Example 1 and then sandwiched between two layers of a fabric made by stitch bonding a melt blown polyurethane nonwoven fabric with a polyester yarn (AB-9125, Nonwoven Center designation), using the sealing, trimming and pouching method in Example 1.

Example 3

Example 1 was repeated except that 7.8 grams of dried (at 80° C. in a forced air oven for at least 12 hours) urea-formaldehyde microcapsules containing octadecane were spread evenly over the surface of the soft resin coated foam and kneaded into the foam with hand pressure just before assembling the foam parts.

Example 4

A custom formable shoe insert was made as in Example 2 with the addition of 8.2 grams of dried urea-formaldehyde microcapsules containing octadecane as in Example 3.

Example 5

The custom formable shoe inserts described in examples 1–4 were evaluated by the following steps:
1. Insert removed from pouch and water activated under a stream of tap water at room temperature with squeezing to pump water into the flexible, porous resin coated substrate layer.
2. Excess water squeezed out, water dried with a towel, and placed in shoe.
3. Before 1.5 minutes elapsed, a human foot placed in the shoe, applying pressure to the insert according to the weight of the foot and leg in the neutral position with the person in a seated position.
4. After 3–5 minutes, insert removed and dried.
5. Insert replaced in the shoe and the shoe worn with the insert for several hours.

It was found that during the handling of the insert the resin was completely contained by the outer layer, and no resin was transferred to the hands of the user. During wear, good arch support and cushioning were evident.

Example 6

A temperature comparison was made between the inserts of Example 1 and Example 3. Using a thermocouple, the temperature under a person's foot arches in shoes was measured and found to be about 27.9 and 28.5° C. (82.2 and 83.3° F.), respectively for left and right shoe, before any inserts had been placed therein. The cured insert of Example 1 was put in the left shoe and that of Example 3 was put in the right shoe. After putting the respective shoes on the left and right feet, the thermocouple was again put under each arches and the temperatures were found to be about 30.8 to 31.1° C. (87.5 to 88° F.) with the Example 1 insert and about 28.1 to 28.5° C. (82.5 to 83.3° F.) with the Example 3 insert. This indicated that the microcapsules in Example 3 kept the foot cooler in the presence of a custom fitting insert than without the microcapsules.

Example 7

A contoured piece of open celled foam (8800 available from Technifoam, Inc., Minneapolis, Minn.), shaped to generally fit the bottom of a human foot under the heel and arch area, was coated (in a dry air environment) with the semi-rigid resin of Example 1, by applying the resin to the dried foam and kneading the resin in by hand until a uniform distribution was achieved. This was sealed in a foil-lined pouch for later use.

A 0.32 cm thick, medium density, compression set resistant, partially open-celled foam (Poron® Cushion Insole Material, 4708-01-20215,I4; available from Rogers Corporation, Rogers, Conn.) was cut to the shape of the inlay found in a size 12 shoe. This, along with an extensible (45% in machine direction, and 90% in the cross direction), 0.064 cm thick, non-woven fabric (polyester yarn stitch bonded to a 0.018 cm thick, melt-blown polyurethane web), was dried for several hours in an oven at 87° C. (190° F.). The preceding thicknesses were measured using a model 49-70 Testing Machines, Inc. (Amityville, L.I., N.Y.) thickness gauge with a gap plate diameter of approximately 1.9 cm. In a dry air environment, the resin coated foam piece above was removed from the pouch, and placed against the dried partially open-celled foam with the arch and heel areas of the resin coated foam piece positioned to correspond with the arch and heel areas of the partially open-celled foam. The dried fabric was then sealed to the partially open-celled foam at the periphery of the resin coated foam piece using hot melt glue (Jet-Melt™, available from 3M™, St. Paul, Minn.). The assembled construction was sealed in a foil-lined pouch for later evaluation.

A lace-up, size 12 shoe was removed from a human foot, and the inlay that came with the shoe was taken out. The above-assembled construction was removed from the pouch, held under a stream of slightly warm water with squeezing, thoroughly wetting the resin coated foam contained within. The excess water was squeezed out, and the assembly was quickly dried by pressing between towels. The assembly was placed in the shoe, and a human foot was placed on the assembly in the shoe. The shoe was laced up, and while in a sitting position, the foot and leg were placed in a neutral position. After 3 minutes, the shoe was removed, and the custom formed shoe insert was taken out and allowed to air dry.

The above custom formed shoe insert was placed in the shoe and worn for several hours. This was found to provide significantly more comfort and support than when the inlay that came with the shoe was used in the shoe.

Example 8

The soft and the semi-rigid resins of Example 1 were separately coated into two sheets (about 2 cm thick by 15.2 cm by 15.2 cm) of an open celled polyether urethane foam (trade designation 17230, available from Federal Foam Technologies, Inc., Ellsworth, Wis.). The foam sheets had a density of about 0.029 g/cm$^3$ and an IFD value of about 2.011 kPa (44 lbs./ft.$^2$). In a low humidity room, the resin was applied to the foam sheets at about 86% by weight of the combined weight of the resin and foam and uniformly distributed throughout the foam by hand kneading. Each resin impregnated foam sheet was then sealed in a foil pouch for later use.

Each of the above sheets of resin impregnated foam was removed from the pouch, dipped in room temperature water (about 22° C.), squeezed several times, and then squeezed to remove excess water. Each activated sheet of resin impregnated foam set in about 3 minutes and was allowed to fully cure and dry in the open at room temperature for several weeks.

An Instron Model 1122 equipped with and MTS System No. 7999 control system and computer running Test Works 3.09 software (available from MTS Systems Corp., Minneapolis, Minn.) was set up with a 1000 pound load cell to which a cylindrical probe having a flat end was attached. The flat end of the probe had a surface area of 1.26 cm². The cured sheet of resin impregnated foam containing the soft resin was measured for thickness (2.01 cm, 0.79 in.) and placed on a flat base under the probe and load cell, and the cross-head was lowered so that the probe pressed against the soft (after setting) resin foam at a pre-load of about 0.25 kg. The cross-head was then lowered a rate of 127 cm/minute (50 inches/minute) until a load of 1.33 $kg_{force}$ ($kg_f$) was reached to yield a force of 10.3 Newtons (1.33 $kg_f$/1.26 cm²=1.05 $kg_f$/cm² or 10.3 N). The distance that the probe moved into the soft (after setting) resin foam was measured. A total of ten measurements were taken, each measurement in a different area of the soft (after setting) resin foam sheet. A mean value of about 0.713 cm (0.281 inches) was found which corresponded to about 36% compression, that is, ((0.713 cm÷2.01 cm)×100=36%).

Similarly, the cured sheet of resin impregnated foam containing semi-rigid resin was measured for thickness (1.97 cm, 0.775 in.) and tested for compression resistance. A mean value of 0.234 cm (0.092 inches) was found corresponding to 11.9% compression.

What is claimed is:

1. A custom-formable shoe insert, comprising:

a conformable substrate layer having first and second portions, wherein the first portion is impregnated with a first settable resin and the second portion is impregnated with a second settable resin, wherein the first and second settable resins set after exposure to an activator and the first settable resin allows the substrate layer to be compressed from about 35 to 75% after setting and the second settable resin allows the substrate layer to be compressed from about 9 to 25% after setting; and an outer layer that is impervious to the first and second settable resins but at least a portion of which is pervious to the activator.

2. A custom-formable shoe insert, comprising:

a conformable substrate layer, wherein at least a portion of the substrate layer is impregnated with a storage-stable, settable resin that set after exposure to an activator, the settable resin comprises microcapsules to achieve a cooling effect, and the microcapsules comprise urea formaldehyde containing octadecane; and an outer layer that is impervious to the settable resin but at least a portion of which is pervious to the activator.

3. The shoe insert of claim 2, wherein the storage-stable, settable resin comprises about 20 weight percent the microcapsules based on the total weight of the resin.

* * * * *

UNITED STATES PATENT AND TRADEMARK OFFICE
CERTIFICATE OF CORRECTION

PATENT NO. : 6,280,815 B1 Page 1 of 1
DATED : August 28, 2001
INVENTOR(S) : Ersfeld, Dean A.

It is certified that error appears in the above-identified patent and that said Letters Patent is hereby corrected as shown below:

Column 2,
Line 55, "yam" should read -- yarn --.

Signed and Sealed this

Thirty-first Day of December, 2002

JAMES E. ROGAN
*Director of the United States Patent and Trademark Office*